Patented Mar. 4, 1941

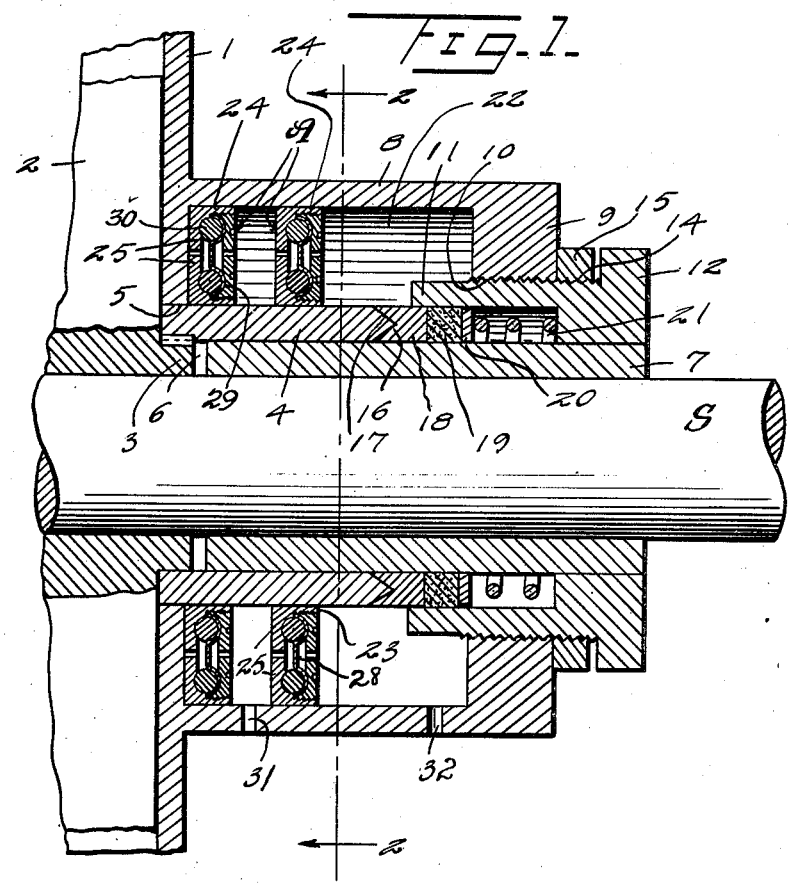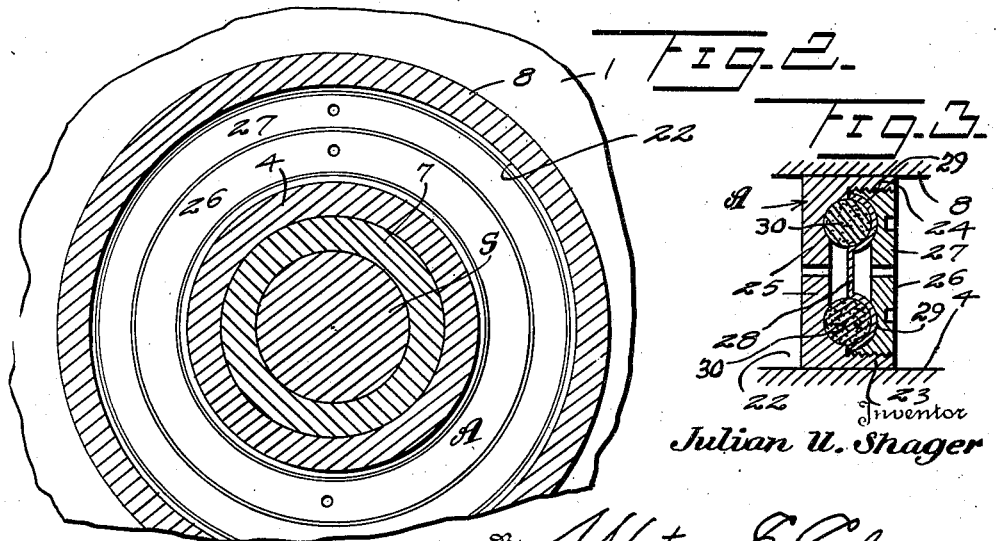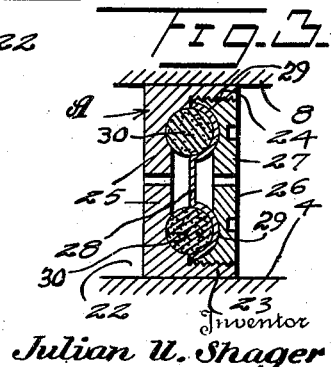

2,233,557

UNITED STATES PATENT OFFICE 2,233,557

PACKING FOR SHAFTS

Julian U. Shager, Tacoma, Wash.

Application July 29, 1939, Serial No. 287,400

5 Claims. (Cl. 308—36.2)

This invention relates to packing for shafts and has relation more particularly to a packing especially designed and adapted for use in connection with the shaft of a rotary pump to prevent escape of liquid from the interior of the pump.

It is an object of the invention to provide a packing for the impeller shaft of a pump for handling caustic or other active chemicals and wherein the packing is so constructed and assembled to substantially eliminate the chemical within the pump reaching the shaft and the bearings therefor.

The invention consists in the details of construction and in the combination and arrangement of the several parts of my improved packing for shafts whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:

Figure 1 is a view partly in section and partly in elevation illustrating a packing constructed in accordance with an embodiment of my invention;

Figure 2 is a detailed sectional view taken substantially on the line 2—2 of Figure 1;

Figure 3 is a fragmentary sectional view taken through one of the seals as herein set forth.

As disclosed in the accompanying drawing, 1 denotes a side wall of the stator or housing of the pump in which is arranged an impeller 2 mounted for rotation with the shaft S. The impeller 2 is provided at its hub portion with an extension 3 to which is tightly secured the surrounding end portion of an elongated sleeve 4. The wall 1 of the housing or stator is provided with a suitable opening 5 to accommodate the inner or adjacent end of the sleeve 4 and the hub extension 3. The portion of the sleeve 4 disposed outwardly of the wall 1 of the housing or stator coacts with the adjacent portion of the shaft S to provide an annular space 6. Extending within and snugly fitting within this space 6 is the inner end portion of an elongated bearing sleeve 7 through which the shaft S is directed. This bearing sleeve 7 is of a length to extend a material distance beyond the outer end of the sleeve 4.

The wall 1 carries a cylindrical housing 8 concentric to the applied sleeve 4 and which is of a length to terminate beyond the outer end of the sleeve 4. The outer end portion of the housing 8 is provided with an inwardly disposed and surrounding flange 9 of considerable thickness and which provides a central opening 10. Threading through this opening 10 from without is an annular extension sleeve 11 carried by a gland member 12 snugly mounted upon the bearing sleeve 7 outwardly of the flange 9. The inner portion of this member 12 in its periphery is provided with a rabbet 14 upon which is threaded a lock nut 15 for holding coaction with the adjacent outer face of the flange 9. The threaded surface of the rabbet 14 is in continuation of the inner threaded surface of the extension sleeve 11. The inner face of the extension 11 is substantially coplanar with the outer surface of the sleeve 4 and the outer end edge of the sleeve 4 is V-shaped in cross section, as at 16, with the apex outwardly disposed. This oppositely beveled portion 16 is snugly received within a correspondingly formed groove or channel 17 provided in the outer face of the annular member or ring 18 snugly surrounding the bearing sleeve 7 with its outer or peripheral face substantially flush with the outer or peripheral face of the sleeve 4. This member or ring 18 is of desired metal such as Monel, nickel or silver.

The outer portion of this member or ring 18 is snugly received within the adjacent end portion of the extension 11 and surrounding the sleeve 7, and butting the adjacent end of the member or ring 18 is a packing 19 surrounding the sleeve 7 and contacting the outer face of the packing 19 is a washer 20 of desired material. Interposed between this washer 20 and the gland member 12 is a coil spring 21 of a tension to constantly urge the packing 19 toward and against the member or ring 18 to assure a maximum of efficiency of the seal made by the packing.

To further increase the efficiency of my improved packing structure I position within the chamber 22 afforded by the housing 8 a pair of seals A. These seals A are positioned with one of the seals in direct contact with the wall 1 and the second seal slightly spaced therefrom. Each of these seals A, as herein disclosed, comprises two concentric rings 23 and 24. The ring 23 snugly surrounds the sleeve 4 and the ring 24 has close contact with the inner surface of the housing 8. These rings each have one marginal portion defined by a lateral flange 25, the flange of one ring being disposed toward the other.

Threading upon the ring 23 is an annular member 26 and threading within the ring 24 is an annular member 27. Clamped between one of the flanges 25 and the annular member 26 and the second flange 25 and the member 27 are the marginal portions of an annular pliable sheet 28 which assures and maintains an effective seal yet allows thrust motion without breaking. These sheets 28 are of metal and the marginal portions thereof are formed to provide relatively large beads 29 to facilitate desired mounting thereof. As clearly illustrated in the accompanying drawing, the beads 29 coact with the packing ring 30.

The space between the seals A is to be filled with lubricant or neutralizing liquid and the housing 8 in its lower portion is provided with one or more filling openings 31 and also with one or more drain openings 32. The opening or openings 31 can also be used for draining while the opening or openings 32 can also be employed for filling if desired.

It is to be particularly pointed out that in my invention as herein embodied the amount of packing material used is very small and that the packing 19 does not have direct contact with the shaft, thus eliminating any resistance against the shaft by the packing with, of course, resultant wear. This particular arrangement results in a better lubricated bearing. It is also to be pointed out that the construction and assembly as herein comprised allows the chamber 22 to provide a space for a water or neutralizing liquid seal so that corrosive substances, acids or gases can be sealed in or eliminated.

From the foregoing description it is thought to be obvious that a packing for shafts constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. In combination with a rotary pump including a stator, an impeller within the stator and a shaft for the impeller extending out through a wall of the stator, a housing extending out from the wall of the stator through which the shaft is directed, said housing being concentric to the shaft and having its outer end provided therearound with an inwardly disposed flange defining a central opening, a sleeve surrounding the shaft and having an extremity secured to the hub portion of the impeller, the opening of the wall of the stator thru which the shaft is directed being of a diameter to accommodate and receive said end portion of the sleeve, said sleeve terminating inwardly of the flange at the outer end of the housing and spaced from the shaft, a bearing sleeve for the shaft having an end portion engaging within the space between the shaft and the first sleeve, a gland member mounted upon the outer portion of the bearing sleeve and having a tubular extension threading thru the opening defined by the flange of the housing and extending within the housing beyond said flange, a ring surrounding the bearing sleeve for contact with the first named sleeve, said ring being of hardened material, packing surrounding the bearing sleeve in contact with the ring, and an expansible member interposed between the packing and the gland member constantly urging the packing toward and in contact with the ring.

2. In combination with a rotary pump including a stator, an impeller within the stator and a shaft for the impeller extending out through a wall of the stator, a housing extending out from the wall of the stator through which the shaft is directed, said housing being concentric to the shaft and having its outer end provided therearound with an inwardly disposed flange defining a central opening, a sleeve surrounding the shaft and having an extremity secured to the hub portion of the impeller, the opening of the wall of the stator thru which the shaft is directed being of a diameter to accommodate and receive said end portion of the sleeve, said sleeve terminating inwardly of the flange at the outer end of the housing and spaced from the shaft, a bearing sleeve for the shaft having an end portion engaging within the space between the shaft and the first sleeve, a gland member mounted upon the outer portion of the bearing sleeve and having a tubular extension threading thru the opening defined by the flange of the housing and extending within the housing beyond said flange, a ring surrounding the bearing sleeve for contact with the first named sleeve, said ring being of hardened material, packing surrounding the bearing sleeve in contact with the ring, and an expansible member interposed between the packing and the gland member constantly urging the packing toward and in contact with the ring, the opposed faces of the first sleeve and the ring being formed to provide an interfitting groove and extension V-shaped in cross section.

3. In combination with a rotary pump including a stator, an impeller within the stator and a shaft for the impeller extending out through a wall of the stator, a housing extending out from the wall of the stator through which the shaft is directed, said housing being concentric to the shaft and having its outer end provided therearound with an inwardly disposed flange defining a central opening, a sleeve surrounding the shaft and having an extremity secured to the hub portion of the impeller, the opening of the wall of the stator thru which the shaft is directed being of a diameter to accommodate and receive said end portion of the sleeve, said sleeve terminating inwardly of the flange at the outer end of the housing and spaced from the shaft, a bearing sleeve for the shaft having an end portion engaging within the space between the shaft and the first sleeve, a gland member mounted upon the outer portion of the bearing sleeve and having a tubular extension threading thru the opening defined by the flange of the housing and extending within the housing beyond said flange, a ring surrounding the bearing sleeve for contact with the first named sleeve, said ring being of hardened material, packing surrounding the bearing sleeve in contact with the ring, and an expansible member interposed between the packing and the gland member constantly urging the packing toward and in contact with the ring, the lower portion of the housing being provided with a drain opening.

4. In combination with a rotary pump including a stator, an impeller within the stator and a shaft for the impeller extending out through a wall of the stator, a housing extending out from the wall of the stator thru which the shaft is directed, said housing being concentric to the shaft and having its outer end provided therearound with an inwardly disposed flange defining a central opening, a sleeve surrounding the shaft and having an extremity secured to the hub portion of the impeller, the opening of the wall of the stator through which the shaft is directed being of a diameter to accommodate and receive said end portion of the sleeve, said sleeve terminating inwardly of the flange at the outer end of the housing and spaced from the shaft, a bearing sleeve for the shaft having an end portion engaging within the space between the shaft and the first sleeve, a gland member mounted upon the outer portion of the bearing sleeve and having a tubular extension threading through the opening defined by the flange of the housing and extending within the housing beyond said flange, a ring surrounding the bearing sleeve for contact with the first named sleeve, said ring being of hardened material, packing surrounding the bearing sleeve in contact with the ring, an expansible member interposed between the packing and the gland member constantly urging the packing toward and in contact with the ring, and spaced sealing devices engaged within the housing at the inner end portions of the housing and first sleeve, the lower portion of the housing being provided with openings to allow filling of or draining from the space between the seals and from the space between the outer seal and the flange of the housing.

5. In combination with a rotary pump including a stator, an impeller within the stator and a shaft for the impeller extending out through a wall of the stator, a housing extending out from the wall of the stator through which the shaft is directed, said housing being concentric to the shaft and having its outer end provided therearound with an inwardly disposed flange defining a central opening, a sleeve surrounding the shaft and having an extremity secured to the hub portion of the impeller, the opening of the wall of the stator thru which the shaft is directed being of a diameter to accommodate and receive said end portion of the sleeve, said sleeve terminating inwardly of the flange at the outer end of the housing and spaced from the shaft, a bearing sleeve for the shaft having an end portion engaging within the space between the shaft and the first sleeve, a gland member mounted upon the outer portion of the bearing sleeve and having a tubular extension threading thru the opening defined by the flange of the housing and extending within the housing beyond said flange, a ring surrounding the bearing sleeve for contact with the first named sleeve, said ring being of hardened material, packing surrounding the bearing sleeve in contact with the ring, an expansible member interposed between the packing and the gland member constantly urging the packing toward and in contact with the ring, spaced sealing devices engaged within the housing at the inner end portions of the housing and first sleeve, the lower portion of the housing being provided with openings to allow filling of or draining from the space between the seals and from the space between the outer seal and the flange of the housing, each of said seals comprising an annular member surrounding the first sleeve, an outer annular member concentric to the first named member snugly engaging within the housing, and a flexible metallic member held to said annular members and bridging the space therebetween.

JULIAN U. SHAGER.